US007346888B1

(12) United States Patent
Srinivasan et al.

(10) Patent No.: US 7,346,888 B1
(45) Date of Patent: Mar. 18, 2008

(54) USE CASE INTEGRATION

(75) Inventors: Lavanya Srinivasan, Overland Park, KS (US); Courtlan M. Telford, Overland Park, KS (US); Nalledath Vinodkrishnan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 682 days.

(21) Appl. No.: 10/790,368

(22) Filed: Mar. 1, 2004

(51) Int. Cl.
*G06F 9/44* (2006.01)
(52) U.S. Cl. .................................................. 717/105
(58) Field of Classification Search ................. 717/105
See application file for complete search history.

(56) References Cited

U.S. PATENT DOCUMENTS

| | | | |
|---|---|---|---|
| 6,023,578 A * | 2/2000 | Birsan et al. ............... | 717/105 |
| 6,950,802 B1 * | 9/2005 | Barnes et al. ................. | 705/7 |
| 7,003,766 B1 * | 2/2006 | Hong ........................... | 717/144 |
| 7,114,146 B2 * | 9/2006 | Zhang et al. ................ | 717/106 |
| 2002/0078432 A1 * | 6/2002 | Charisius et al. ........... | 717/102 |
| 2004/0083448 A1 * | 4/2004 | Schulz et al. ............... | 717/101 |
| 2004/0103396 A1 * | 5/2004 | Nehab ......................... | 717/127 |
| 2004/0153533 A1 * | 8/2004 | Lewis ......................... | 709/223 |
| 2004/0266442 A1 * | 12/2004 | Flanagan et al. ............ | 455/445 |
| 2005/0125806 A1 * | 6/2005 | Bussler et al. ............... | 719/316 |
| 2005/0154695 A1 * | 7/2005 | Gonzalez et al. ............. | 707/1 |
| 2006/0203732 A1 * | 9/2006 | Covino et al. ............... | 370/241 |

OTHER PUBLICATIONS

Kelly, Michael B;The TeleManagement Forum's Enhanced Telecom Operations Map (eTOM), p. 109-119, Mar. 2003, retrieved from google.com Apr. 23, 2007.*
Collins, Michael; "Formal Methods", 1998, Carnegie Mellon University, retrieved from google.com.*
Lewis, David; Wade, Vincent; Cullen, Brian; "Towards the Technology Neutral Modeling of Management Components", p. 1-13, 2003, Trinity College Dublin, Department of Computer Science, retrieved Apr. 23, 2007 from google.com search.*
Huang, Jenny; TMF White Pater-NGOSS and MDA, ATT Labs, Feb. 2004, retrieved Apr. 23, 2007 google.com.*

* cited by examiner

*Primary Examiner*—Mary Steelman

(57) ABSTRACT

A system for building software use cases and related state diagrams based on a model of business activities is provided. The system comprises the model of business activities and a computer based modeling tool that is used to compose the use cases and the related state diagrams. The system includes an integration component, which maps the business activities to use cases, and a graphical user interface, which illustrates the relationships among use cases and the relationships between use cases and business requirements. A state diagram component maps business activities to assist in the preparation of state activity diagrams. The model of business activities enumerates business activities and associates each business activity with the business domain in which the business activity is normally conducted. The integration component provides a list of selectable business activities to the graphical user interface from which to compose use cases and state activity diagrams.

20 Claims, 9 Drawing Sheets

USE CASE INTEGRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software for assisting engineering activities, and more particularly, but not by way of limitation, to a system and method for aiding use case integration.

BACKGROUND OF THE INVENTION

Development of quality enterprise software, for example, software which is employed by large corporations to conduct operations, is a complicated task. Many organizations have evolved standardized processes for developing software in order to achieve consistency and predictability in their software development activities. This consistency and predictability affect how much time it takes to develop the software and whether the software is robust and reliable.

Typically a software development process produces intermediate products or artifacts along the path to producing the finished software product. Production of these artifacts serves to provide a sense of direction to the software developers. The software developers are instructed about the content and level of detail that the artifacts are expected to contain. Creating the artifact according to these expectations compels the software developer to work through specific issues of the software development and hence defines a sequence and direction to the software development work. The artifacts serve as an excellent basis to share technical information among software developers, testers, and managers. Often the software development process involves reviews of the in-progress software development to decide whether the work has matured sufficiently to advance to the next stage in the software development cycle or whether more work is required.

A variety of names for software artifacts are employed by different companies. Some of the typical artifacts are briefly described below.

Requirements documents define functional requirements that the finished software is expected to satisfy. Sometimes requirements are divided into high level customer requirements and into low level derived or engineering requirements.

Use cases are brief textual descriptions of a business operation at a high level. They are intended to capture the nature of a single business operation from the view of the end user and not the view of the technologist developing the software. Sometimes a hierarchy of use cases may be defined, where a high level use case may be broken down into a number of middle level use cases, and the middle level use cases themselves may be broken into a number of low level use cases. At each lower level in the use case hierarchy, the view of the given use case is narrower and the information captured in the use case is more detailed.

State activity diagrams represent a sequence of activities that a system may perform. The state activity diagram captures a dynamic view of a system, while other artifacts may focus more on a static view of the system. The activities may comprise use cases. Thus, a state activity diagram may relate use cases to each other and capture the logical sequence of the use cases.

Message sequence diagrams, also referred to as sequence diagrams, may be employed to capture inter-module or inter-application communication sessions. These diagrams indicate the participants in the communication session, the senders and the receivers of each communication, the content of each communication, and the sequence of the communications. The communications may be termed messages.

Interface documents define the interface between different modules, systems, or applications. Such documents may define the communication technology employed, for example, sockets, message queues, Java remote method invocation (RMI), transmission control protocol (TCP), and Ethernet. They may define the structure of the information communicated in terms of bit sequences, byte sequences, and fields. They may define the valid values or valid range of values and the meanings of values which may be communicated. They may define a mandatory message sequence, or handshake, for establishing a communication link, for exchanging information, and for terminating the communication link. Sometimes these documents are called interface control documents (ICDs).

High level design documents (HLDs) and low level design documents (LLDs) are comprehensive documents which may contain any of the preceding information. Additionally, HLDs and LLDs typically provide a narrative text description of design. HLDs provide less detail than LLDs. The definition of the type of information belonging in a HLD versus the information belonging in an LLD differs from one software development organization to another. Some software development organizations produce only HLDs and no LLDs. Some software development organizations do not produce either HLDs or LLDs, but capture the information with other artifacts.

Software development tools have been created to aid software developers to develop software and to encourage them to follow and adhere to the corporate software development process. These tools may provide editors for quick construction and revision of message sequence diagrams, interface documents, and other documents. These tools may perform rules checking between development artifacts, for example, to validate that the corporate software development process is adhered to, and to discover shortcomings in a given artifact. Some software development tools may be sold or leased as off-the-shelf software from software vendors. These off-the-shelf software development tools may provide a means to extend their capabilities and to customize their behavior to accommodate the needs of a specific software development organization. Some of these tools may be referred to as computer aided software engineering (CASE) tools.

SUMMARY OF THE INVENTION

A system for building software use cases and related state diagrams based on a model of business activities is provided. The system comprises the model of business activities, and a computer based modeling tool that is used to compose the use cases and the related state diagrams. The system further includes an integration component that maps the business activities enumerated in the model of business activities to use cases. The system includes a graphical user interface, which illustrates the relationship among use cases and the relationship between use cases and business requirements, and a state diagram component operable to prepare state activity diagrams based on the business activities. The model of business activities enumerates business activities and associates each business activity with the business domain in which the business activity is normally conducted. The integration component is in communication with the model of business activities and with the modeling tool and provides a list of selectable business activities to the graphical user interface from which to compose use cases and state activity diagrams.

A method for building a state activity diagram based on a business activity model is also provided. The method comprises providing the business activity model, segmenting use cases based on the hierarchical relationships among the business activities identified in the business activity model, selecting one of the use cases, and displaying the use case in a state activity diagram. The business activity model enumerates the business activities, associates each business activity with a level in a hierarchy of business activities, and associates each business activity with the business domain in which the business activity is normally conducted. The state activity diagram displays business activities in the business domain column associated with the business activity.

A method for building software use cases based on a model of business activities is also provided. The method comprises providing the model of business activities, selecting a business activity identified in the model of business activities, and defining software use cases based on a business requirement. The method includes providing an integration component to organize, in a modeling tool, the software use cases according to the relationships among the software use cases identified in the model of business activities. The method also includes using the modeling tool to build software use cases in accordance with the model of business activities. The model of business activities enumerates the business activities and associates each business activity with the business domain in which the business activity is normally conducted.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The Tele-Management Forum has published an enhanced Telecom Operations Map (eTOM) which identifies the typical business activity domains and business processes or activities observed by telecommunications companies. The eTOM can provide a useful guide when building new systems, as a check on whether the normal business activities and functions are supported by the new system. The eTOM may also provide a useful tool for examining the operations of a telecommunications company from an external viewpoint, such as when a stock analyst compares the organizational structure of a telecommunications company's operations with the eTOM model.

Early in a project, planners lack sufficient details since project boundaries remain vaguely defined and have not yet articulated all of the sub-processes or all of the interactions across business domains. For example, at this early stage interactions between the customer service business activity domain and the billing business activity domain may not have been identified. It is difficult, in this context, to plan budgets and schedules accurately. What is needed is a tool which can assist analysts and planners to identify and define the processes of a project at multiple levels of detail.

Figure 1:
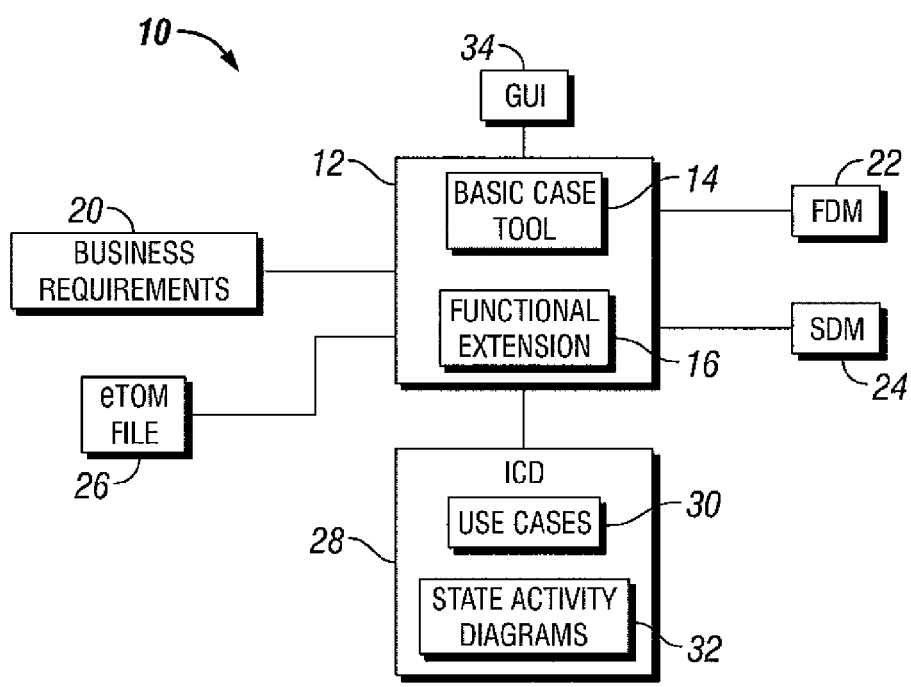
FIG. 1 is a block diagram illustrating a system for creating and displaying use cases and state activity diagrams according to one embodiment.

Turning now to FIG. 1, a block diagram of a system 10 for creating use cases and state activity diagrams is provided. Use cases and state activity diagrams are useful in performing project analysis and planning. An analysis tool 12 comprises a basic computer aided software engineering (CASE) tool 14 and a functional extension 16 of the basic CASE tool 14. The functional extension 16 adds significant additional capabilities to the functionality provided by the basic CASE tool 14. The basic CASE tool 14 provides support for software analysis and modeling, and provides various tools to build use cases and state activity diagrams.

The functional extension 16 provides a means to use the Tele-Management Forum eTOM as a guide in the early analysis and planning activities of a project. The functional extension 16 also integrates into the later phases of project analysis, planning, and design by dove-tailing with other analysis and planning tools employed in later project phases. The functional extension 16 supports modeling use cases at three levels—a high level scope use case view, a middle level process use case view, and a low level system integration use case view. These three use case levels map generally to the four levels of the eTOM—level 0, level 1, level 2, and level 3. The scope level use case maps to the eTOM level 0. The process level use case maps to the eTOM level 1 and level 2. The system integration level use case maps to the eTOM level 2 and level 3. The use case model of a project is comprised of all the scope use cases, the process use cases, and the system integration use cases.

A business requirements 20 artifact, a functional design model (FDM) 22 artifact, a system design model (SDM) 24 artifact, an eTOM artifact 26, and an interface control document (ICD) 28 artifact are accessible to the analysis tool 12. The ICD 28 includes use cases 30 and state activity diagrams 32. The eTOM artifact 26 comprises an enterprise version of the Tele-Management Forum eTOM. In the preferred embodiment, the eTOM artifact 26 is a spreadsheet file. A graphical user interface (GUI) 34 is in communication with the analysis tool 12 and is employed to create and review the analysis artifacts throughout the project lifecycle. The GUI 34 provides screens for viewing, creating, and changing analysis artifacts for both the basic CASE tool 14 and the functional extension 16.

The eTOM artifact 26 may provide assistance in understanding the impacts of the project across business activity domains. This may be valuable, because analysts may be experienced in one business activity domain, but not in others. For example, a different order entry mechanism or process may be employed depending on whether a consumer sales channel or a business sales channel is involved. The eTOM artifact 26 may illuminate this relationship between the order entry mechanism and the sales channel early in the planning or analysis phase of the project.

The eTOM artifact 26 elements are associated with the elements of the various analysis views, providing insight and understanding through the later phases of project analysis. The eTOM artifact 26 element associations with the elements of the various analysis views can be used to good effect in early planning efforts for future projects. For example, if a new project maps to eTOM artifact 26 processes which were analyzed in a previous project, looking into the analysis of the earlier project may provide insight for planning the present project, such as identifying system interactions, and may provide a basis for choosing to reuse components developed by the earlier project.

The analysis tool 12 and the GUI 34 are computer programs, each of which may execute on the same or different general purpose computer systems. The GUI 34 may, in some embodiments, be web based. General purpose computer systems are discussed in more detail hereinafter. In the preferred embodiment, the basic CASE tool 14 is the IBM Rational Rose CASE tool.

Figure 2:
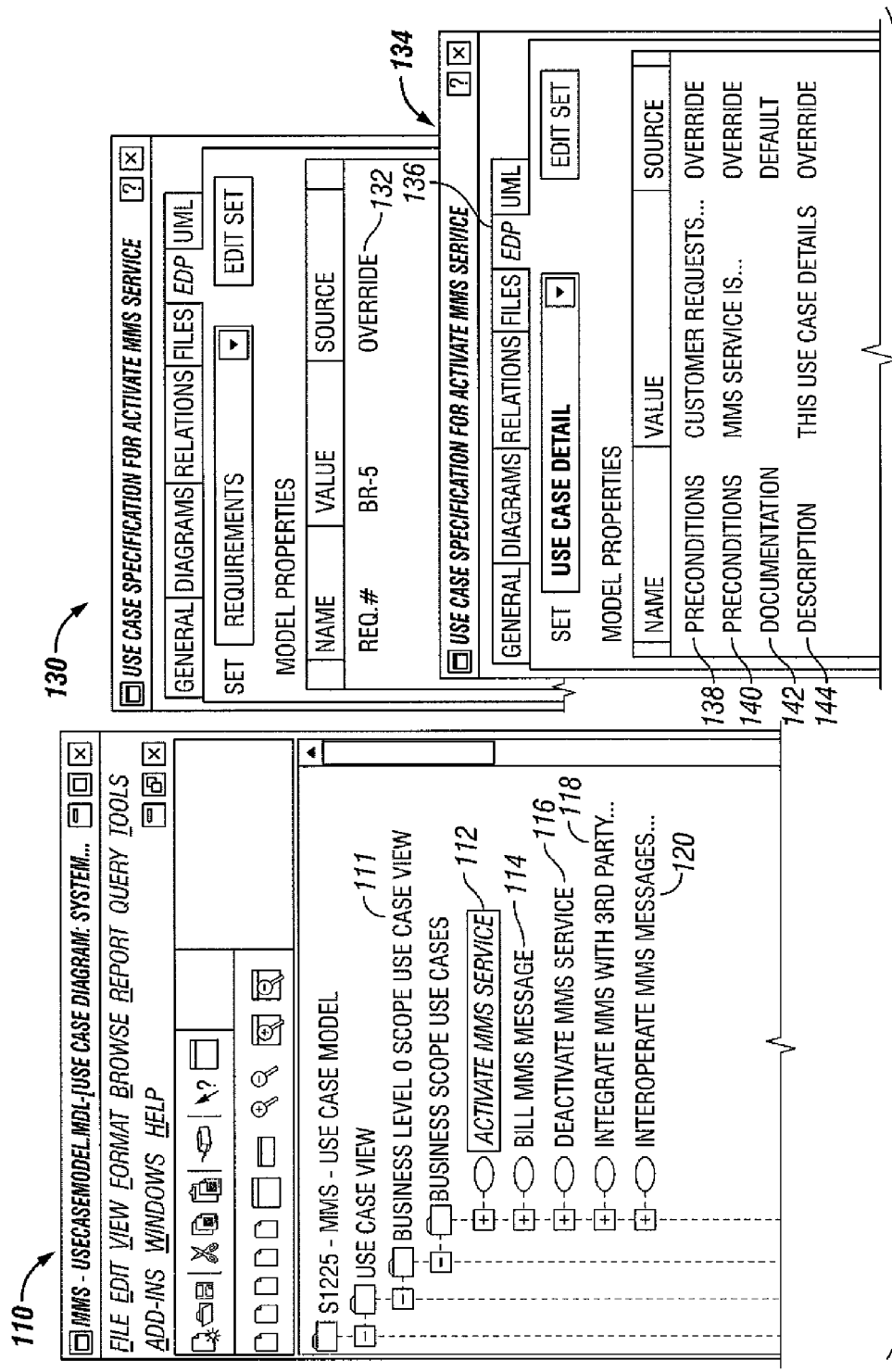
FIG. 2 depicts an exemplary graphical user interface screen for creating scope level use cases.

Turning now to FIG. 2, a first use case screen 110 of the GUI 34 for creating and examining the scope use case views of the use cases 30 is depicted. Note that the first use case screen 110 is exemplary. The comprehensive set of scope use cases contained in the use cases 30 represent the project scope based on the business requirements 20 for the project. The scope use cases are located in the scope use case view folder 111 in the first use case screen 110. There is a linkage between the display of information in the first use case screen 110 and the eTOM artifact 26. The first use case screen 110 lists activities cataloged in the eTOM artifact 26 which may be selected to become scope use cases. The scope use cases correspond to Tele-Management Forum eTOM elements at level 0. The exemplary first use case screen 110 shows scope use cases including an activate multi-media service (MMS) service selection 112, a bill MMS service selection 114, a deactivate MMS service selection 116, an integrate MMS with $3^{rd}$ party content and service selection 118, and an interoperate MMS messages with other carrier hardware selection 120. The business scope use cases are segmented according to the eTOM artifact 26 and map to a high level process.

The activate MMS service selection 112 is shown as highlighted or selected. Selection is accomplished by double clicking on the desired line. This causes a scope use case specification screen 130 of the GUI 34 to open. The scope use case specification screen 130 contains a requirements number display line 132 which indicates the specific requirement associated with the scope use case. A use case specification detail screen 134 of the GUI 34 may be selected to display by double clicking on an EDP tab 136 of the scope use case specification screen 130. The use case specification detail screen 134 displays other details of the scope use case, including a precondition display line 138, a post condition display line 140, a documentation display line 142, and a description display line 144. A precondition represents something which must occur before the selected scope use case can be invoked. A post condition represents the system state after the scope use case has completed.

Figure 3A:
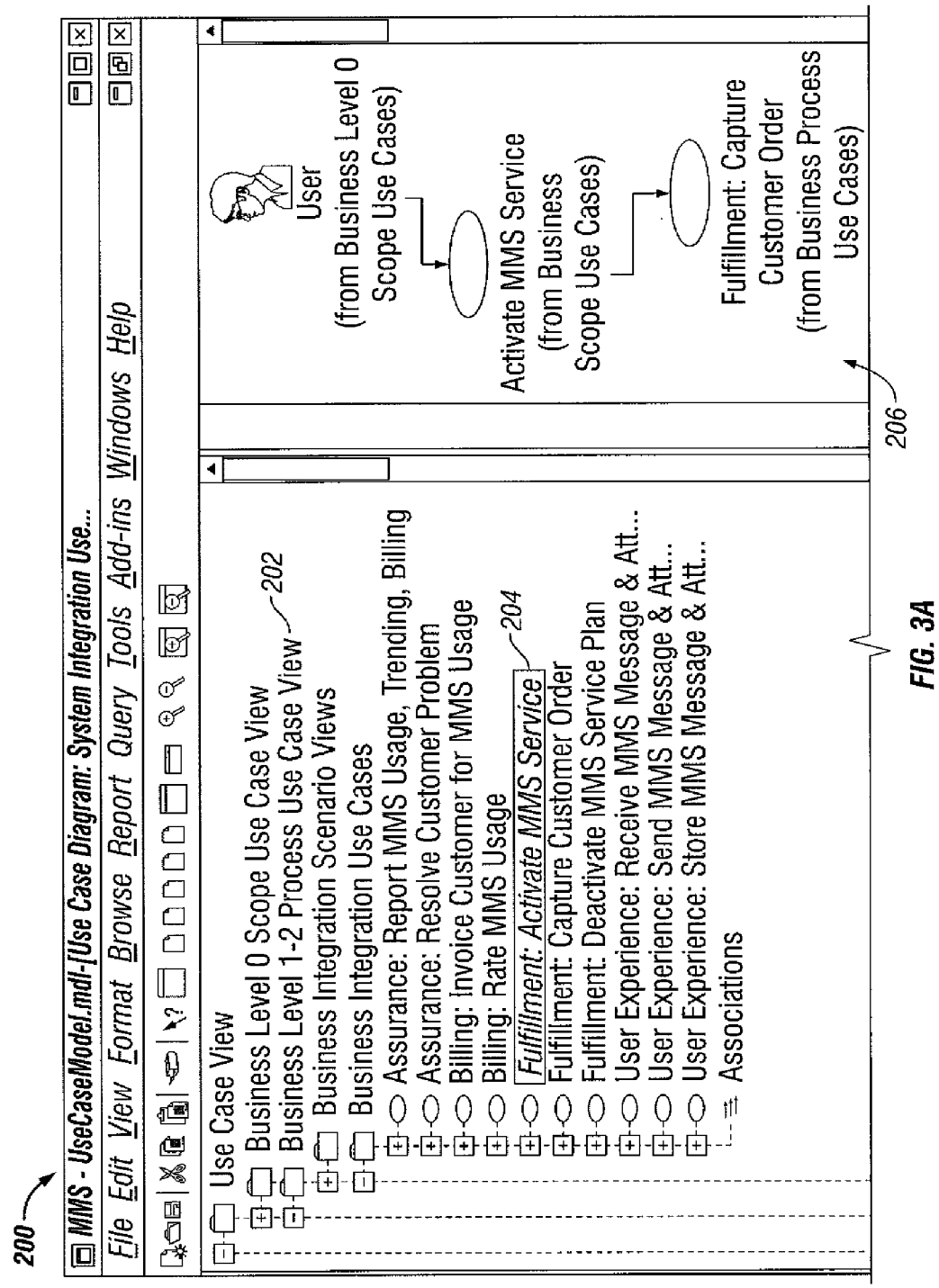
FIG. 3A depicts a first graphical user interface screen for creating process level use cases.

Turning now to FIG. 3A, a second use case screen 200 of the GUI 34 for creating and examining the process use case views of the use cases 30 is depicted. Note that the second use case screen 200 is exemplary. The comprehensive set of process use cases in the use cases 30 represent the business process functionality based on the functional requirements. The process use cases are located in a process use case view folder 202 in the second use case screen 200. Process use cases are segmented according to the eTOM artifact 26. There is a linkage between the display of information in the second use case screen 200 and the eTOM artifact 26. The second use case screen 200 lists activities cataloged in the eTOM artifact 26 which may be selected to become process use cases.

Several exemplary process use cases are listed in the second use case screen 200, and a fulfillment activate MMS service process use case 204 is shown as selected. A use case diagram 206 displays on the right side of the second use case screen 200. The use case diagram 206 illustrates the actors, the several levels of use cases 30, and the relationships among the use cases 30. The use case diagram 206 view is helpful in that it aids understanding, orienting the analyst to other use cases above, below, and beside the current use case in the use case model hierarchy.

Figure 3B:
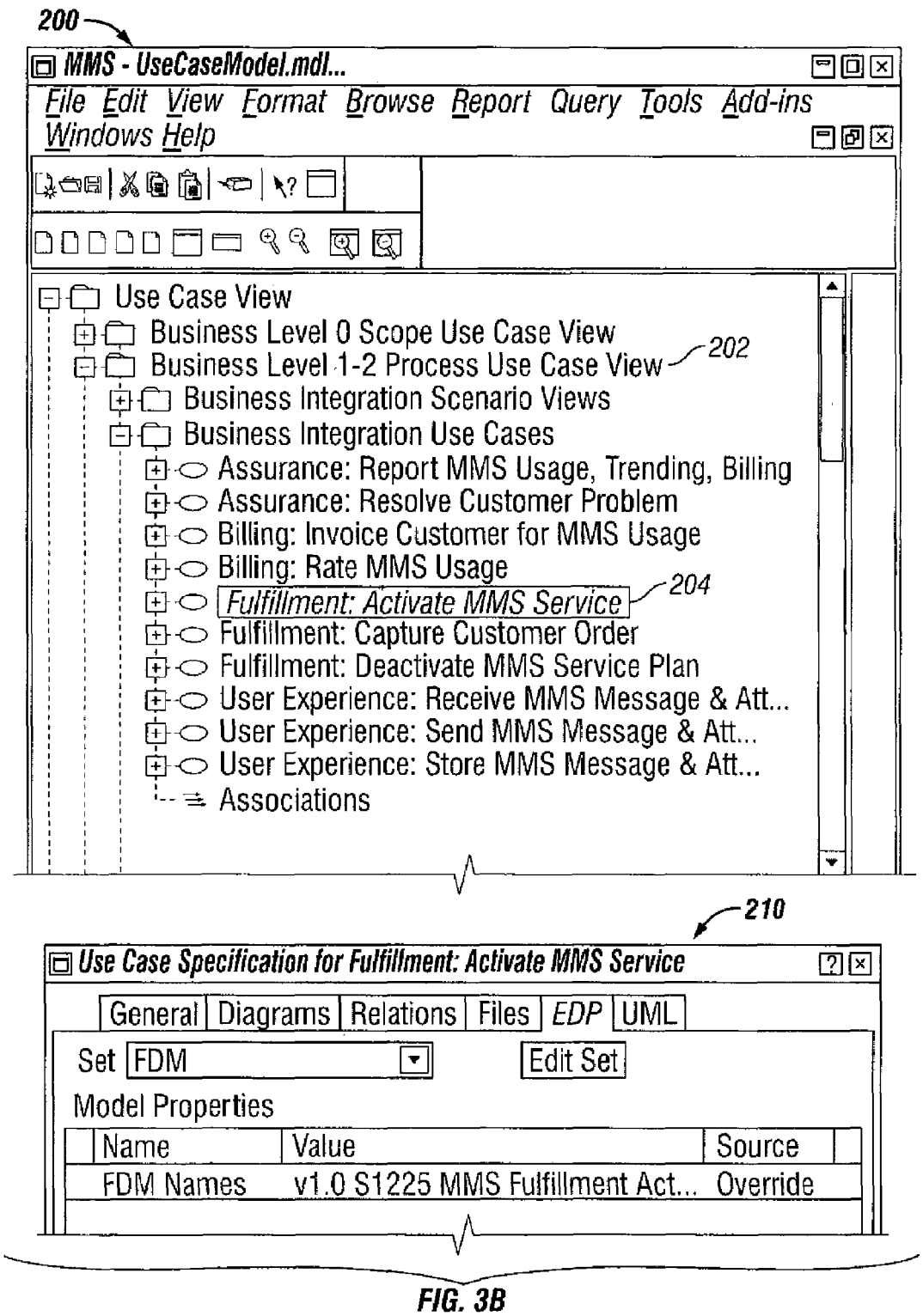
FIG. 3B depicts a second graphical user interface screen for creating process level use cases.

Turning now to FIG. 3B, a second view of the second use case screen 200 is depicted. If the process use case display line is selected, for example the fulfillment activate MMS service process use case 204, a process use case specification window 210 of the GUI-34 the FDM that is linked to the process use case.

Figure 4A:
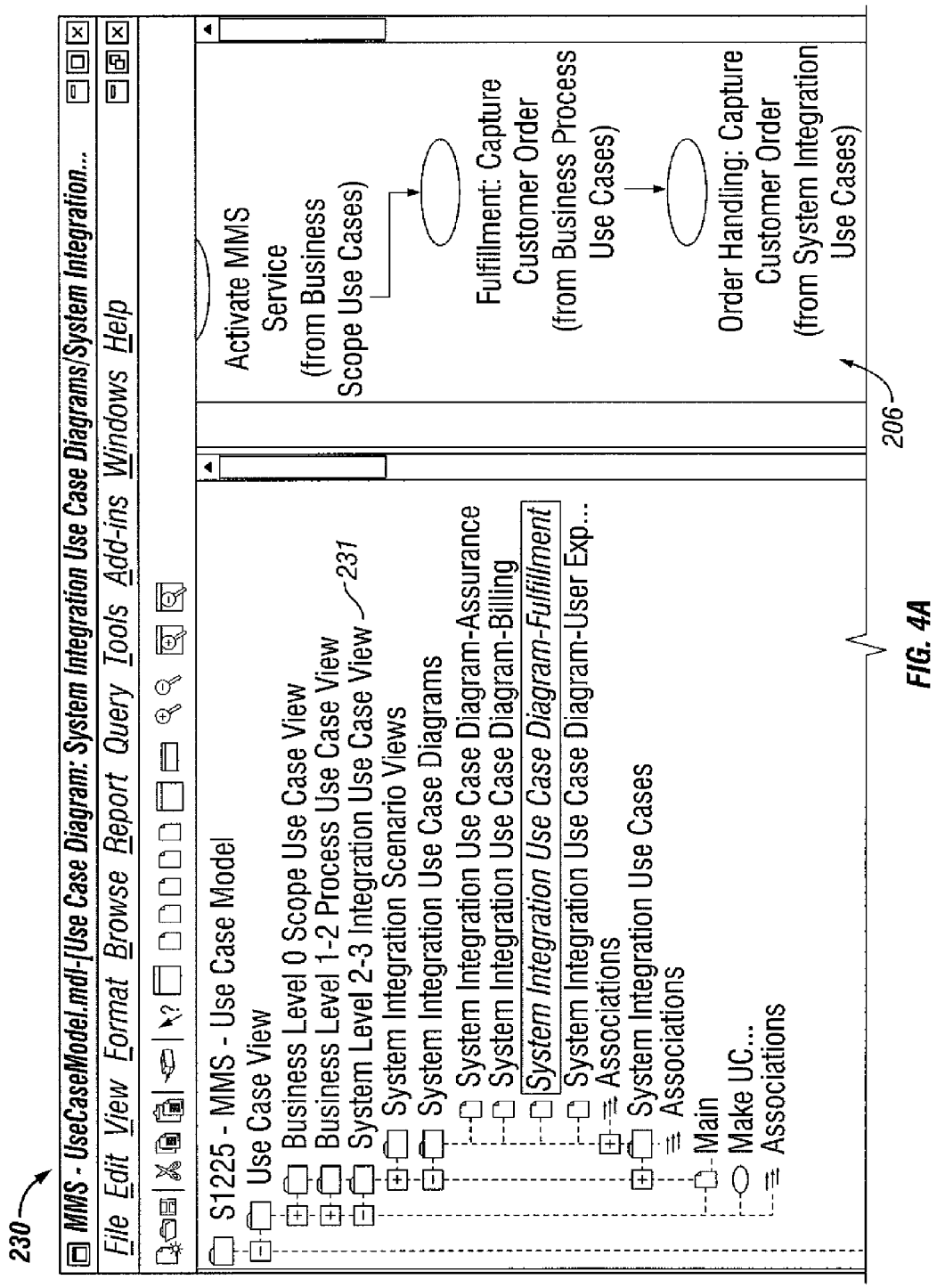
FIG. 4A depicts a first graphical user interface screen for creating system integration level use cases.

Turning now to FIG. 4A, a third use case screen 230 of the GUI 34 for creating and examining the system integration use cases views of the use cases 30 is depicted. Note that the third use case screen 230 is exemplary. The comprehensive set of system integration use cases in the use cases 30 represent the system integration functionality based on the system requirements gathered during software requirements modeling and based on the interface documentation gathered during use of the basic CASE tool 14 to analyze and document interfaces. The system integration use cases are located in the system integration use case view folder 231, in the third use case screen 230. System integration use cases are segmented according to the eTOM artifact 26. There is a linkage between the display of information in the third use case screen 230 and the eTOM artifact 26. The third use case screen 230 lists activities cataloged in the eTOM artifact 26 which may be selected to become system integration use cases 30. Several exemplary system integration use cases are listed in the third use case screen 230. The use case diagram 206 illustrates actors, the several levels of use cases 30, and the relationships among the use cases 30. The use case diagram 206 view is helpful in that it aids understanding, orienting the analyst to other use cases above, below, and beside the current use case in the use case model hierarchy.

Figure 4B:
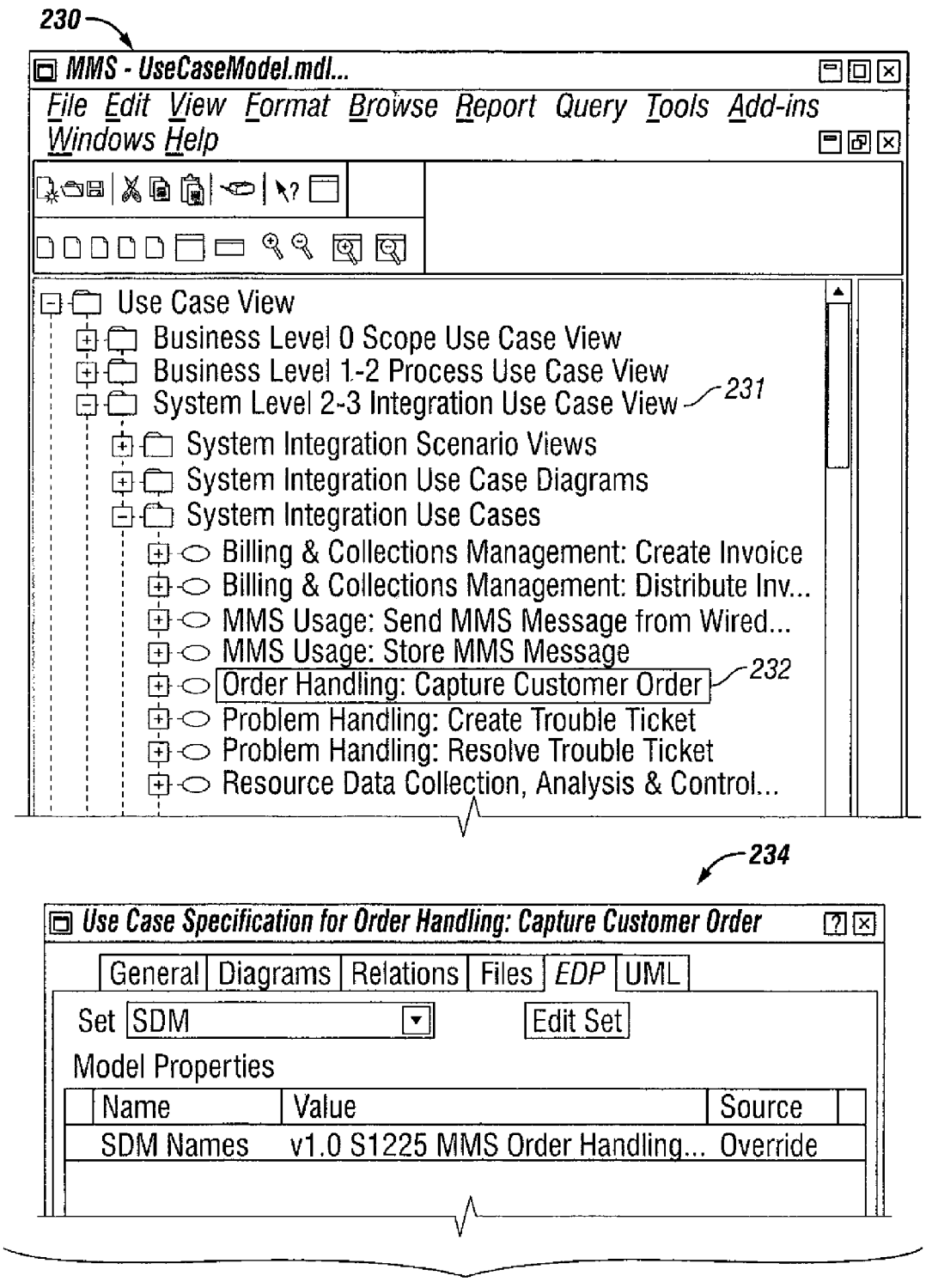
FIG. 4B depicts a second graphical user interface screen for creating system integration level use cases.

Turning now to FIG. 4B, a second view of the third use case screen 230 is depicted. If a system integration use case display line is selected, for example an Order Handling Capture Customer Order display line 232, a system integration use case specification window 234 of the GUI 34 displays the system diagram model (SDM) that is linked to the system integration use case.

The interactions are similar when working with both the second use case screen 200 and the third use case screen 230 to build the use case models and to link them to one another. An available use case activity, as enumerated in the eTOM artifact 26, is selected (for example with the mouse), dragged over to the use case diagram 206, and dropped in the desired location. Relationships among the use cases may be established in the use case diagram 206 using, for example, menu selections and the mouse.

Figure 5:
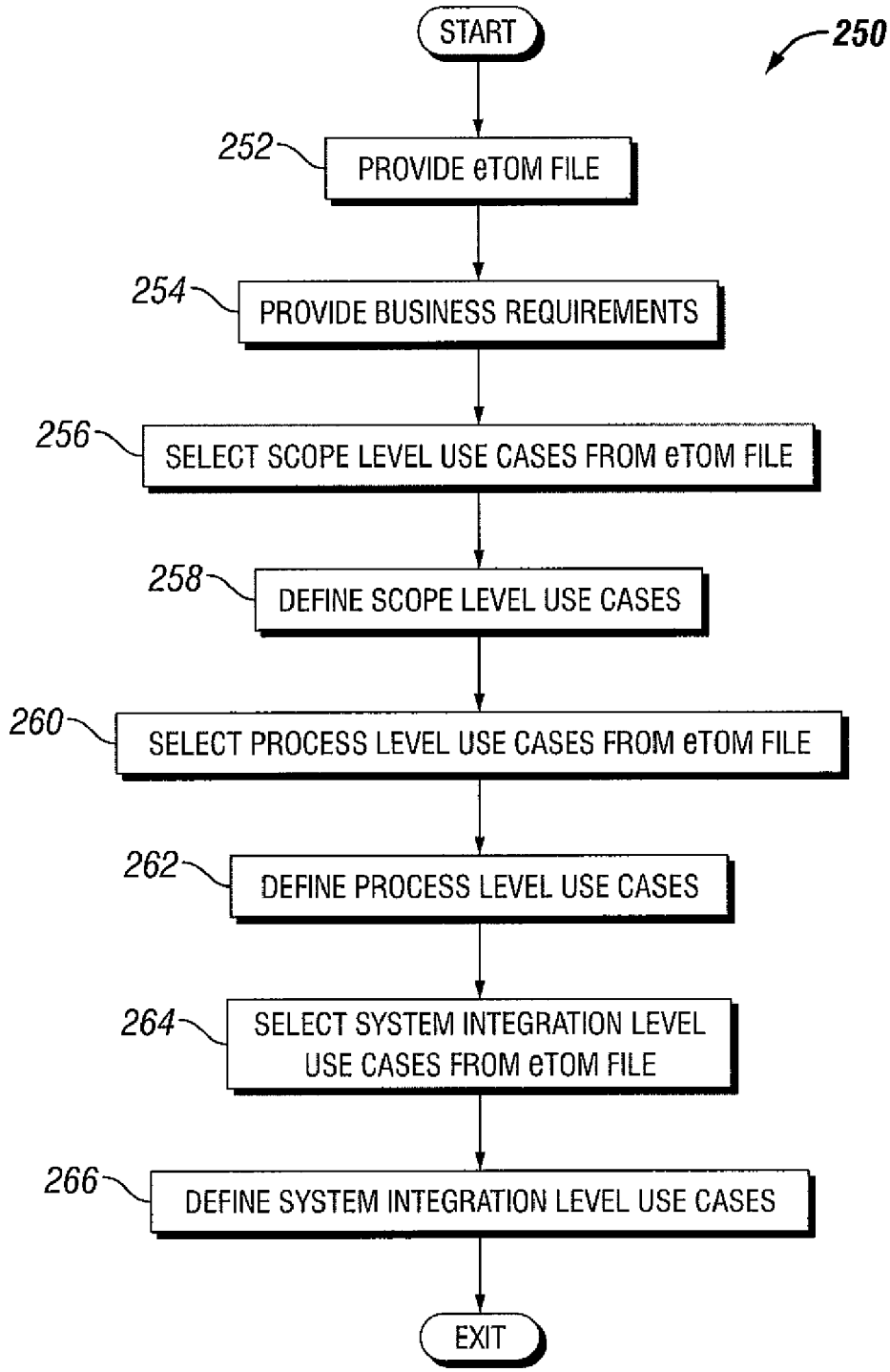
FIG. 5 is a flow chart depicting a process for building a use case model according to one embodiment of the present disclosure.

Turning now to FIG. 5, a flow chart 250 depicts a process for building a use case model using the system 10. The process begins at block 252 where the eTOM artifact 26 is provided. The process proceeds to block 254 where the business requirements 20 are provided. The process proceeds to block 256 where scope level use cases are selected from the eTOM artifact 26. The first use case screen 110 displays a list of processes enumerated in the eTOM artifact 26 as being scope level processes. One of these processes or activities is selected as a scope level use case. The process proceeds to block 258 where the selected scope level use case is defined using, for example, the first use case screen 110.

The process proceeds to block 260 where the second use case screen 200 displays a list of processes enumerated in the eTOM artifact 26 as being process level processes. The process proceeds to block 262 where the selected process level use case is defined using the second use case screen 200.

The process proceeds to block 264 where the third use case screen 230 displays a list of processes enumerated in the eTOM artifact 26 as being system integration level processes. The process proceeds to block 266 where the selected system integration level use case is defined using, for example, the third use case screen 230.

At any of the three use case definition blocks—at the block 258, the block 262, or the block 266—the process may flow back to select and define more scope level, process level, and/or system integration level use cases.

Figure 6:
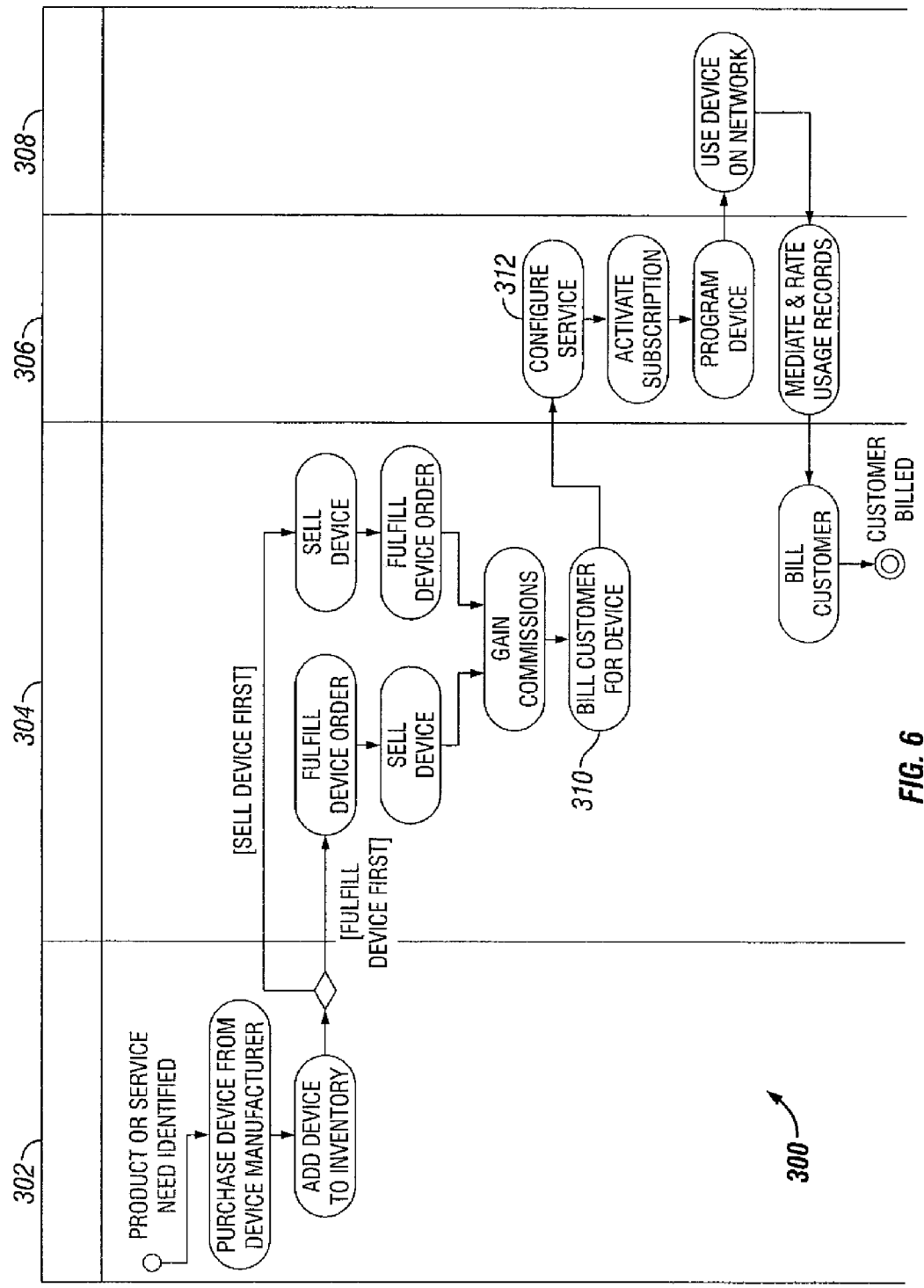
FIG. 6 is a flow chart depicting an exemplary state activity diagram.

Turning now to FIG. 6, an exemplary state activity diagram 300 is depicted. The typical state activity diagram represents a high level business activity as a sequence of finer grained constituent business activities. The business activities are directionally connected or directionally linked. In the exemplary state activity diagram 300, linkage or connection between business activities is represented by a joining line, and direction of linkage or connection is represented by the arrow. Possible alternate processing paths are indicated within the state activity diagram.

The state activity diagram 300 is constructed by selecting activities cataloged in the eTOM artifact 26 and connecting them in sequence. The several activities are depicted within a column corresponding to the business activity domain associated with each activity by the eTOM artifact 26. These business activity domains may include, for example, resource management and operations 302, customer relations management 304, service management and operations 306, and network usage 308, as depicted in FIG. 6.

In some enterprises, computer systems may be aligned along business domains. The state activity diagram 300 illustrates state activity crossing a domain boundary, for example when a Bill Customer for Device 310 state activity flows to a Configure Service 312 state activity. When the boundary is crossed between the customer relations management 304 business domain and the service management and operations 306 business domain, an interface between two different computer systems or between two different computer applications may exist. The state activity diagram 300 may alert analysts and business persons to the presence of system interfaces. The state activity diagram helps the analyst and business person to focus on the dynamic behavior of the system. Some artifacts, for example the use case model, may tend to focus attention on a static view of the system. The state activity diagram, hence, provides a useful complement to the use case model view of the system.

Figure 7:
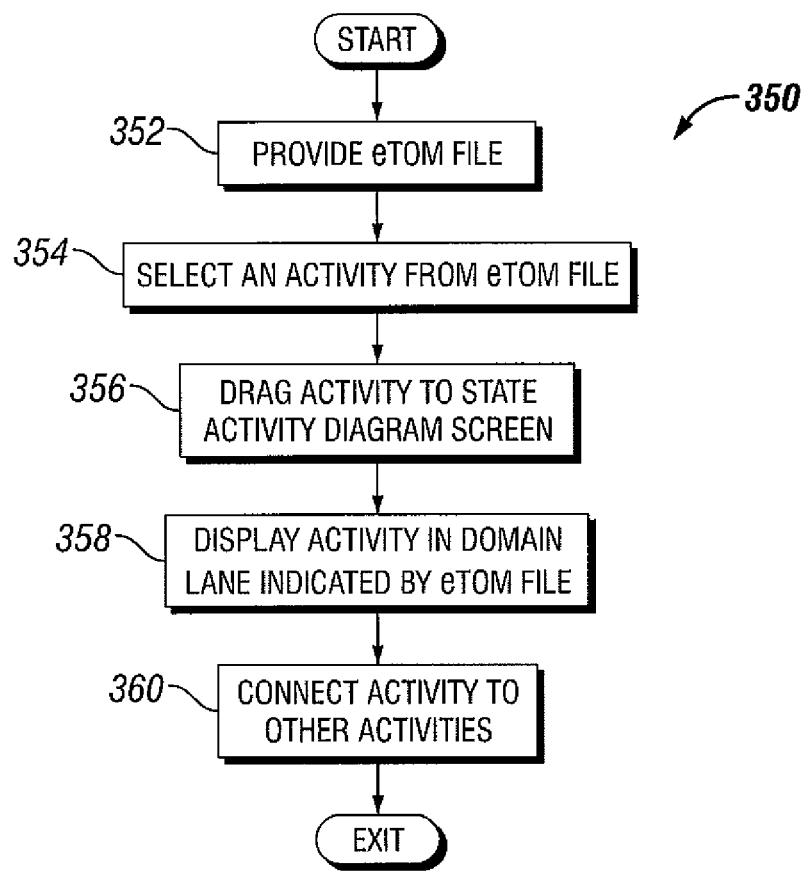
FIG. 7 is a flow chart depicting a process for building a state activity diagram according to one embodiment of the present disclosure.

Turning now to FIG. 7, a flow chart 350 of a process for building a state activity diagram, such as illustrated in FIG. 6, is depicted. The process proceeds to block 352 where the eTOM artifact 26 is provided. The process flows to block 354 where an activity enumerated in the eTOM artifact 26 and displayed in the GUI 34 screen is selected. The process proceeds to block 356 where the activity is dragged to the GUI 34 screen. The process proceeds to block 358 where the activity is displayed in the column of the business domain with which the activity is associated by the eTOM artifact 26. The process proceeds to block 360 where the activity is connected to other activities in the state activity diagram with directional arrows. The process then exits.

Figure 8:
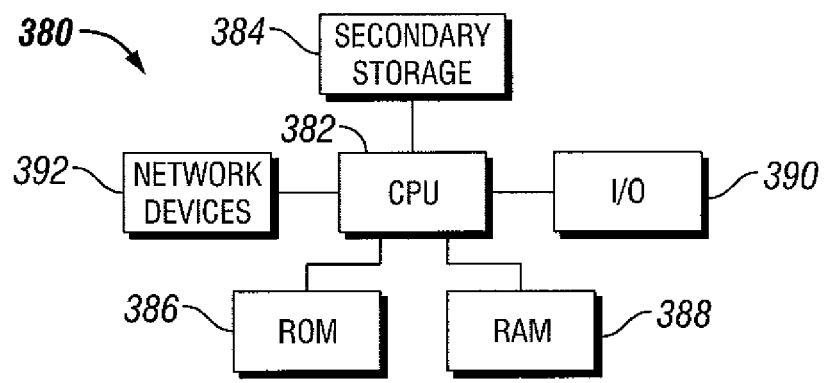
FIG. 8 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

The system 10 described above provides a useful mechanism for informing the early planning and analysis activities of a project with a comprehensive model of the business. The system 10 supports consideration of significant models of activities from and interfaces between systems linked across business domain boundaries.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system embodied in a computer readable medium for building software use cases and related state diagrams for business requirements, the system comprising:
   a business activity model identifying a plurality of business activities, the business activity model maintaining a hierarchical relationship between the plurality of business activities, wherein the hierarchical relationship includes a first number of levels, and wherein each of the plurality of business activities corresponds to one of the first number of levels;
   an integration component in communication with the business activity model, the integration component mapping the plurality of business activities from the hierarchical relationship to a software use case hierarchical relationship, wherein the software use case hierarchical relationship includes a plurality of software uses case levels, and wherein each of the plurality of business activities corresponds to one of the plurality of software use case levels;
   a modeling tool building a software use case based on a business requirement by selecting a first set of the plurality of business activities mapped to at least one of the plurality of software use case levels;
   a graphical user interface illustrating the software use case hierarchical relationship of at least some of the first set of selected business activities; and
   a state diagram component using the modeling tool, the state diagram component building a state activity diagram for at least a portion of the business requirement by selecting a second set of the plurality of business activities mapped to at least one of the plurality of software use case levels, wherein the state activity diagram displays the second set of selected business activities as a directionally linked sequence.

2. The system of claim 1 wherein the business activity model aligns the plurality of business activities to a plurality of business domains.

3. The system of claim 1 wherein the modeling tool is defined to be a computer aided software engineering tool.

4. The system of claim 1 wherein the integration component provides a list of the plurality of business activities selectable for building a state activity diagram.

5. The system of claim 1 wherein the business activity model is based on a business process model that identifies business activity domains and business activities observed by telecommunications companies.

6. The system of claim 5 wherein the business activity model is stored in a spreadsheet file.

7. The system of claim 6 wherein the first number of levels are further defined as a level O of the business process model, a level 1 of the business process model, a level 2 of the business process model, and a level 3 of the business process model.

8. The system of claim 7 wherein the plurality of software use case levels are further defined as a scope use case level, a process use case level, and a system integration use case level, and wherein the integration component maps the plurality of business activities corresponding to the level 0 to the scope use case level, at least some of the plurality of business activities corresponding to the level 1 and the level 2 to the process use case level, and at least some of the plurality of business activities corresponding to the level 2 and the level 3 to the system integration use case level in the modeling tool.

9. The system of claim 8 wherein the at least some of the plurality of business activities in the process use case level represent functionality of a business process based on a functional requirement of the business requirement.

10. The system of claim 8 wherein the plurality of business activities in the scope use case level represent a project scope based on the business requirement.

11. A method for building a state activity diagram, comprising:
   providing a business activity model enumerating domains of a business and a plurality of business activities, the business activity model maintaining a hierarchical association of the plurality of business activities, wherein the hierarchical association includes a first number of levels, and wherein each of the plurality of business activities corresponds to one of the first number of levels;

mapping the plurality of business activities from the hierarchical association to a use case hierarchical association, wherein the use case hierarchical association includes a plurality of use case levels, and wherein each of the plurality of business activities correspond with one of the plurality of use case levels;

selecting at least one of the plurality of business activities mapped to at least one of the plurality of software use case levels; and displaying the selected business activities in a state activity diagram, the state activity diagram providing a first selected business activity associated with a first domain of the business and a second selected business activity associated with a second domain of the business, wherein the state activity diagram displays the selected business activities as a directionally linked sequence.

12. The method of claim 11 wherein the business activity model is based on a business process model that identifies business activity domains and business activities observed by telecommunications companies.

13. The method of claim 11 wherein the use cases are mapped according to one of the first number of levels of a business process model that identifies business activity domains and business activities observed by telecommunications companies.

14. The method of claim 11 wherein the plurality of use case levels includes a business scope use case level, a business process use case level, and a system integration use case level, and wherein the selected business activities are mapped to at least one of the business scope use case level based on the business requirement, the business process use case level based on functional requirements of the business requirement, and the system integration use case level based on system requirements of the business requirement.

15. The method of claim 14 further comprising:
providing a system diagram model related to the system integration use case level;
providing a functional diagram model related to the business process use case level;
using at least a portion of the system diagram model to model the state activity diagram at the system integration use case level; and
using at least a portion of the functional diagram model to model the state activity diagram at the business process use case level.

16. A method for building a software use case, comprising:

providing a business activity model enumerating a plurality of business activities, wherein there is a hierarchical relationship between the plurality of business activities that includes a first number of levels, and wherein each of the plurality of business activities corresponds to one of the first number of levels;

providing an integration component mapping, in a modeling tool, the plurality of business activities from the hierarchical relationship to a software use case hierarchical relationship wherein the software use case hierarchical relationship includes a plurality of software use case levels, and wherein each of the plurality of business activities corresponds to one of the plurality of software use case levels; and selecting for display at least one of the plurality of business activities mapped to at least one of the plurality of software use case levels.

17. The method of claim 16 wherein the business activity model aligns the plurality of business activities according to domains of a business.

18. The method of claim 17 wherein the plurality of software use case levels include a high software use case level, a middle software use case level, and a low software use case level, and wherein the plurality of business activities mapped to the high software use case level comprises at least one of the plurality of business activities mapped to the middle software use case level, and wherein the at least one of the plurality of business activities mapped to the middle software use case level comprises at least one of the plurality of business activities mapped to the low software use case level.

19. The method of claim 16 wherein the business activity model is based on a business process model that identifies business activity domains and business activities observed by telecommunications companies.

20. The method of claim 19 wherein the integration component is operable to organize each of the plurality of use cases according to the one of a plurality of levels of the business process model.

* * * * *